INVENTOR.
Weston H. Jenkins
BY William J. Simmons Jr.
ATTORNEY

United States Patent Office 3,744,983
Patented July 10, 1973

3,744,983
APPARATUS AND METHOD FOR FORMING
SPHERES FROM MOLTEN FUSIBLE MATERIAL
Weston H. Jenkins, Corning, N.Y., assignor to Corning
Glass Works, Corning, N.Y.
Filed Aug. 19, 1971, Ser. No. 172,988
Int. Cl. C03b 19/10
U.S. Cl. 65—21
12 Claims

ABSTRACT OF THE DISCLOSURE

A method and apparatus are disclosed for forming sized spheres or beads of a fusible material such as glass. A voltage of proper amplitude and frequency, which is applied to a stream of molten material issuing from an orifice, acts as a perturbation on the stream and accelerates the formation of drops therefrom. The drops form spheres under the influence of surface tension, and the spheres are collected in a conventional manner.

BACKGROUND OF THE INVENTION

This invention relates to a method and apparatus for forming sized spheres directly from a stream of fusible material. Although this invention encompasses the formation of spheres of fusible materials including natural and synthetic resins, plastics, coal tar pitch and the like, it will be specifically described with reference to a method and apparatus for making glass spheres.

There is presently a need for an apparatus and method capable of producing sized glass spheres or beads which are useful in the manufacture of reflective signs, highway paint, motion picture screens and the like. For such applications it is desirable that the glass beads be of essentially uniform size and substantially spherically shaped. Diffraction of light by non-spherically shaped beads could partially destroy their reflecting effect and thereby limit their usefulness.

One prior art method for forming glass beads involves the grinding of glass into small particles and the injection of the particles into a flame from a burner in order to melt the particles and allow surface tension to form the particles into spheres. Among the disadvantages of such method is the lack of economy due to the need for two separate heating steps in the formation of the glass and the formation of beads from the ground glass. Furthermore, only small particles can be formed by this method, and due to the dispersing effect of the flame, collection of the beads is difficult. The resulting beads are randomly sized, are not necessarily spherically shaped and often include a large number of glass filaments which are formed along with the beads.

Other methods for forming glass spheres involve the formation of a stream of molten glass and the attenuation thereof under the influence of gravity. Absent any external influence on the stream, it is necessary to permit the molten glass to fall for great distances in order to form beads. When a flame is directed against the stream, only small beads can be formed, and the beads are difficult to collect. An ultrasonic generator may be positioned near the molten stream so that the stream passes into a field of ultrasonic waves. The stream is dispersed in a somewhat random manner so that the resultant beads are randomly sized and not necessarily spherical in shape. Also, the ultrasonic generator may be adversely affected by the heat radiated from the stream, and cooling means is therefore usually required.

In accordance with the teachings of U.S. Pat. No. 3,123,855 issued to W. Fischer et al. the breakup of the stream of fusible material is regulated and accelerated by subjecting the stream to low frequency mechanical vibration. This method results in the formation of smaller secondary drops which do not coalesce with the larger primary drops, and thereby results in the formation of beads of various sizes.

In U.S. Pat. No. 3,313,608 issued to E. M. Guyer et al. apparatus is disclosed for causing an electrical current to flow along a free-falling stream of molten glass, and the current carrying glass stream is caused to oscillate by interaction between the magnetic field produced by the electrical current and a second magnetic field transverse thereto. The oscillation of the stream causes the glass to separate into small particles which form spheres. This apparatus thus requires two magnetic fields to oscillate the stream, and it suffers from the disadvantages normally associated with mechanical stream vibrating means.

SUMMARY OF THE INVENTION

The method of forming droplets according to this invention replaces mechanical stream perturbation, whereby the molten stream is caused to physically oscillate vertically or horizontally, with an electrical charge perturbation resulting from the application of a large A.C. field to the molten stream of fusible material.

It is accordingly an object of the present invention to provide an apparatus and method for making glass spheres having a substantially consistent size. Another object is to provide an apparatus and method for producing from a fusible material uniformly shaped spheres having a predetermined, consistent size.

Briefly, the bead forming apparatus of the present invention comprises means for providing a free-falling stream of molten material and means for applying a voltage to the stream. Furthermore, means are provided for varying the frequency and the amplitude of the voltage. In the use of this apparatus, the frequency of the voltage applied to the stream is varied until the best quality drops appear to be formed from the stream. Also the amplitude of the voltage is adjusted to a value at which the amplitude of vibration of the drops between ellipsoidal extremes is minimized and any smaller secondary drops formed along with primary drops tend to coalesce with the primary drops.

DETAILED DESCRIPTION

It is well known that a small diameter jet of liquid is unstable under the influence of surface tension. An undisturbed stream will break into drops of random size after flowing a distance which is related to the velocity of the stream. However, if a periodic perturbation is applied to the stream, the stream passes through a region of instability as the frequency of the disturbance is varied, wherein the stream breaks up into drops with a frequency proportional to the frequency of the disturbance. The wavelength at which maximum instability occurs is proportional to the jet diameter. It is under the conditions of maximum stream instability that both the apparatus of this invention operates. The volume of the drops produced by such a periodically perturbed system can be calculated by dividing the flow rate by the frequency of drop formation.

In accordance with the method of the present invention, drop forming frequency is twice the applied voltage frequency when a large alternating electrical field is applied to a stream of molten material. Apparently a drop is formed either at every reversal or at every maximum of the polarization field which occurs twice each voltage cycle. Best drop formations occurs during conditions of maximum stream instability. It has been found that the wavelength which results in maximum stream instability is equal to about 3.5 to 7 times the diameter of the stream orifice. As the flow-frequency conditions depart further from maximum instability, the magnitude of the response of the stream to the disturbance decreases, until the droplet formation is considered to be of unsatisfactory quality. A stream is considered to be unsatisfactory when smaller secondary droplets are formed and do not coalesce with the larger primary drops, when drop size is not uniform, or when spray is produced at the orifice.

Figure 1:
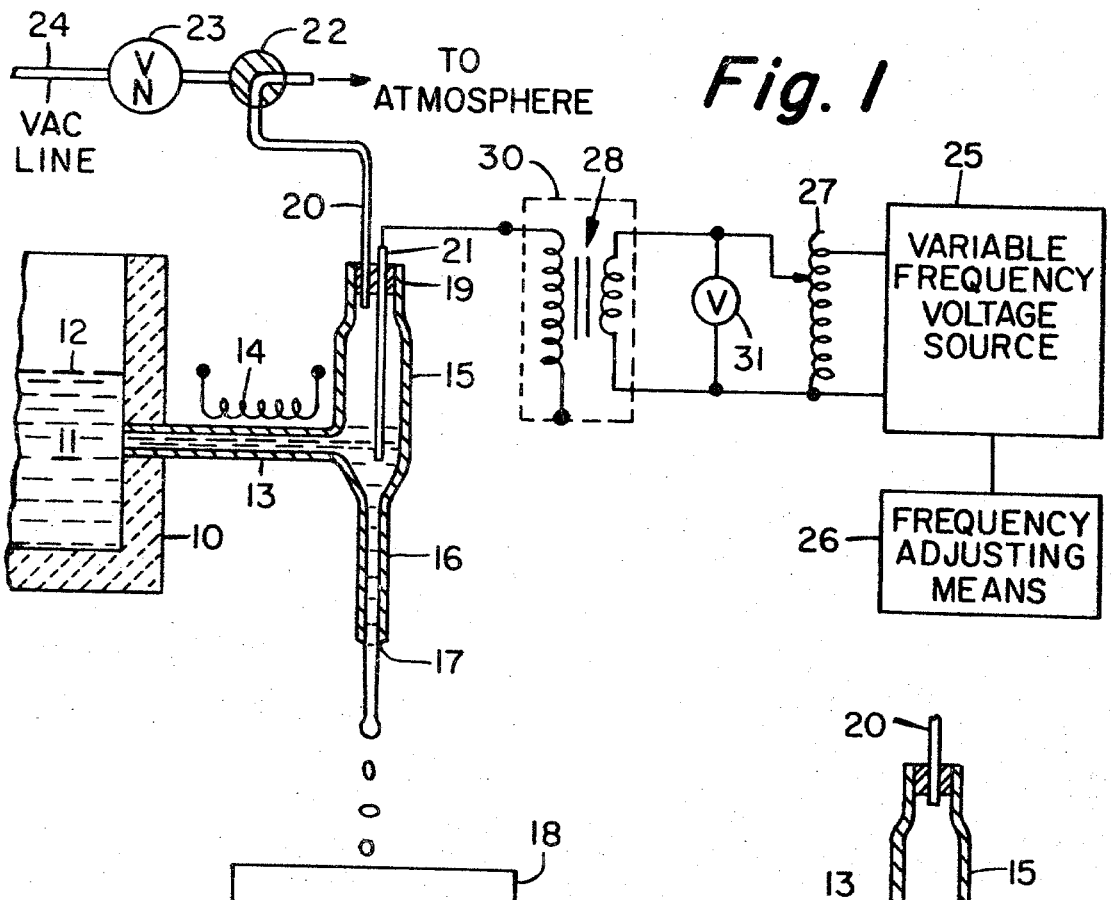
FIG. 1 is a schematic side elevational view in section illustrating a preferred embodiment of the invention.

The formation of good drops, and therefore good spheres, can be obtained by regulating the rate of fluid flow as well as by regulating the amplitude and frequency of the applied electric field. Apparatus for controlling these variables is shown in FIG. 1 in which there is shown a fragmental portion of a glass tank 10, containing a supply of molten glass 11 having a substantially constant head or glass surface level 12. A thin-walled metering tube 13 having a heating element 14 associated therewith, is shown having an inlet end communicating with glass tank 10 below the surface 12 of the supply body 11 and an outlet end communicating with a reservoir 15 which forms a part of a delivery tube 16. The mean diameter of the reservoir is preferably greater than the mean diameter of the metering tube. Reservoir 15 has a bottom outlet communicating with delivery tube 16, which extends downwardly therefrom and has a delivery orifice or outlet 17 at the bottom end thereof. The orifice may be chamfered to produce an optimum flow therefrom. The particular diameter of the metering tube and the diameter and length of the delivery tube depends on the range of flow control desired. A stream of molten material emanates from orifice 17 and, as molten particles separate from the stream, they are permitted to fall a short distance before entering a collecting tank 18.

The upper end of reservoir 15 narrows into a tubular portion 19 into which a vacuum pipe 20 and a conductive electrode 21 extend. Vacuum pipe 20 is connected to a vacuum line 24 through a two-way valve 22 which connects pipe 20 either to exterior atmosphere or to the vacuum line. A needle valve 23 positioned within line 24 regulates the pressure in reservoir 15 and thereby provides continuous flow control over a wide range of glass flow rates.

A variable frequency voltage source 25 is provided, the frequency of which can be controlled by frequency adjusting means 26 which may consist of any well known frequency controlling means such as a variable capacitor in inductor, switched crystals, or the like. Source 25 may be connected to electrode 21 by a variac 27 and a voltage step-up transformer 28, one terminal of the secondary winding of which is directly connected to electrode 21, the other being connected to the conductive transformer case 30 which is indicated by dashed lines. The circuit shown in FIG. 1 is intended to be illustrative of any means for providing a high voltage of variable frequency and amplitude to electrode 21. A voltmeter 31 connected across the primary winding of transformer 28 gives an indication of the voltage across the secondary winding since the voltage transformation ratio is known. The voltage across the secondary winding of transformer 28 may be varied by changing the position of the tap on variac 27.

Figure 2:
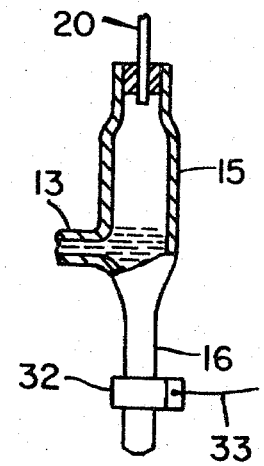
FIG. 2 is a side elevational view, partially in section, depicting an alternate form of delivery structure which may be used in the apparatus of FIG. 1.
Figure 3:
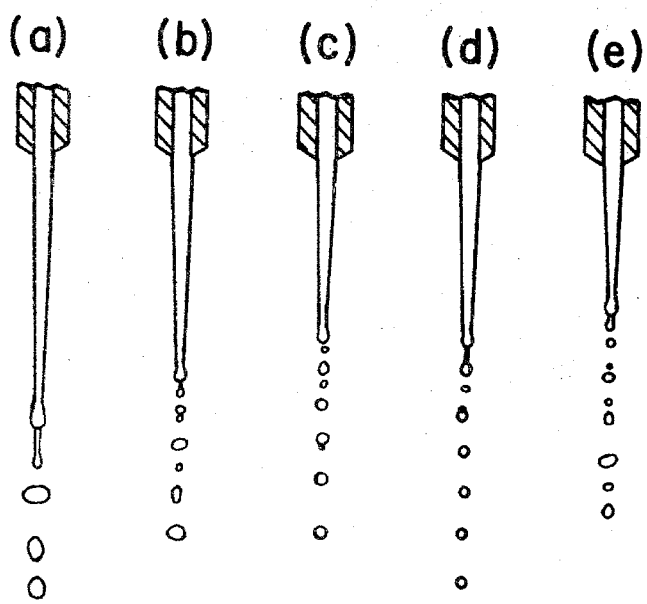
FIG. 3 illustrates the manner in which the molten stream breaks into droplets under the influence of various electric fields.

The embodiment shown in FIG. 2 is an alternative apparatus of connecting the output of transformer 28 to the molten glass, and it may be used when delivery tube 16 is metallic. A metallic clamp 32 is attached to the delivery tube and is connected to transformer 28 by a lead 33.

The voltage appearing at clamp 32 is conducted through metallic delivery tube 16 to the liquid glass which is contained therein. The rate of glass flow from orifice 18 can be controlled as follows. When valve 22 is in the position shown in FIG. 1, so that the reservoir is open to the atmosphere, a differential pressure between the inlet and outlet ends of submerged metering tube 13 is produced by head 12 of the molten supply body 11 above the metering tube 13. When the system is operated under such conditions, the minimum flow rate is produced. When valve 22 is rotated so that vacuum pipe 20 is in communication with vacuum line 24, a pressure differential will exist across the ends of the metering tube 13, depending upon the amount of vacuum applied by pipe 20. As the amount of pressure differential across the metering tube increases, such as by decreasing the pressure in reservoir 15, the flow rate through metering tube 13 increases, and the glass level in vertical delivery tube 16 increases until the flow rate established by the metering tube is attained through outlet 17. Therefore, the head of molten glass maintained in reservoir 15 plus the effect of the vacuum determines the flow rate through orifice 17.

Some of the parameters of the apparatus shown in FIG. 1 which are subject to variance are the diameter of orifice 17 and the pressure in reservoir 15. In addition, the amplitude and frequency of the voltage applied to electrode 21 are variable. Some of the properties of the fusible material 11 which will affect the operation of the apparatus are viscosity, surface tension, and dielectric constant. The amount of fusible material in tank 10, the dimensions of tube 13 and orifice 17, the pressure in reservoir 15, and the viscosity of the fusible material all have an effect on the rate of flow from orifice 17.

Maximum quality drop formation occurs when the flow of liquid from orifice 17 is near the no-flow limit. Since the technique of this invention is most likely used for moderately high tolerance diameter control, drop production is considered acceptable only when the drop forming stream is stable with respect to time, i.e., not degenerating or alternating between good and bad. Also, the entire mass of the stream must go into the formation of primary drops, thereby not generating spray at the point of stream disintegration or secondary drops which do not consistently coalesce with the primary drops.

The size of the drops is proportional to the orifice diameter when the perturbation of the stream causes it to flow under conditions of maximum instability. Under these conditions, drop size is proportional to the cube root of the frequency of the perturbation. From these relationships, it can be ascertained that a slight drift from the exact conditions of maximum stream instability will not appreciably affect drop size. Therefore, drop size can be closely controlled by appropriate orifice diameter without strict concern for flow or frequency, both of which are permitted some latitude from optimum values.

The specification of a drop diameter will determine the required orifice diameter, which in turn will specify a certain frequency range in which drop production is excellent. The temperature of the fusible material establishes the viscosity thereof. Once the viscosity is specified, the flow rate appropriate to the specified diameter and the recommended frequency range of the applied voltage can be determined. The desired flow rate and the viscosity will determine what pressure to apply in the reservoir 15. Thus, the desired drop diameter and viscosity will almost completely specify the required system to produce the drops; it will specify orifice diameter, a range of voltage frequencies, and the pressure in the reservoir 15.

After a given flow has been established by such conditions as viscosity, reservoir pressure, and orifice diameter, the frequency of the voltage applied to the electrode 21 may be varied over a small band and still produce good quality drops. This range of frequencies can be determined by varying the frequency of the voltage from source 25 and observing the effect on drop formation, taking into consideration drop size uniformity, spray formation, type of secondary drop formation and the like. For a flow rate any frequency from 108 to 120 cycles per second may produce drops that are observed to be acceptable. However, if the flow rate were decreased somewhat, a second band of frequencies, e.g., 90 to 100 cycles per second may be found to provide best results.

Once the output of voltage source 25 is set to a frequency within the permissible band for the particular flow rate established, the amplitude of the voltage applied to electrode 21 must be adjusted or tuned to an optimum value, at which drop formation is much better than at nearby voltage amplitudes. This optimum voltage is not necessarily unique for a given set of stream conditions; often two such voltages exist. When the voltage amplitude is not optimum, the detached masses of liquid into which the stream is resolved do not at once assume and retain a spherical shape, but execute a series of vibrations, being alternately compressed and elongated in the direction of the axis of symmetry. When ellipsoidal drops are formed, the eccentricity thereof oscillates with one half the voltage frequency, i.e., if the major axis of the drops were horizontal when initially formed, it would be vertical one voltage cycle later. The effect of voltage tuning is to change the amplitude of the drop vibrations, and when optimum voltage tuning is achieved, to bring the amplitude to zero. At this point the tendency for secondary drops to coalesce with the primary drops increases sharply. As the voltage amplitude is varied beyond tuned conditions, the drops again become ellipsoidal in shape. The overall quality of drop formation at tuned voltages is much better than at other voltages.

The effects of voltage on a falling stream of molten material are illustrated in FIG. 3. In FIG. 3(*a*), where no voltage is applied, drop diameter is random, with formation of droplets occurring at random intervals. The same stream having a voltage applied thereto, which is less than the tuned voltage, is illustrated in FIG. 3(*b*). The secondary drops do not coalesce with the primary drops and the drops exhibit an elliptical shape as a result of their vibration. In FIG. 3(*c*) where the voltage applied to the stream is very close to the tuned voltage, the droplets are almost spherical, but the secondary drops do not immediately coalesce with the primary drops. The effect of optimum voltage tuning is illustrated in FIG. 3(*d*). From the point of individual drop formation, there is evidence of uniform diameter and spacing, and the drops are spherically shaped. The secondary drops quickly coalesce with the primary drops. The effect of a voltage greater than the tuned voltage is illustrated in FIG. 3(*e*). The drops again become ellipsoidal in shape, and their vibration eccentricity is opposite to that shown in FIG. 3(*b*) where the voltage is less than the tuned voltage. This comparison is made by measuring the distance from the orifice, and not by counting the number of drops after initial drop formation. It is noted that in FIG. 3(*e*), secondary drops are not coalescing with the primaries.

FIG. 3 illustrates the fact that the stream is shortened by the application of a voltage, the frequency of which is within the proper frequency band as determined by the various parameters of the stream producing system. The application of a voltage, the amplitude of which is less than the tuned voltage, shortens the stream somewhat. As is illustrated by FIG. 3(*e*), the greatest voltage amplitude produces the shortest stream.

A tuned voltage which is applied to the electrode 21, i.e., the amplitude of the voltage across the secondary winding of the transformer 27 when optimum voltage tuning is achieved, may be any voltage from about two thousand volts up to 15,000 volts or more depending upon the particular fusible material being used. One of the factors which determines the tuned voltage is the dielectric constant of the fusible liquid. In general, a molten stream having a low dielectric constant is less responsive to an applied electric field than a stream having a high dielectric constant. Since drops are formed at every half cycle of the applied voltage, adjacent drops are oppositely charged and therefore possess an inherent attraction for each other. A higher electric field applied to the stream increases the tendency for adjacent drops to coalesce, a usually undesirable condition. Materials having a higher dielectric constant are therefore preferred over those having a lower dielectric constant since a higher dielectric constant material responds to a lower electric field. However, this coalescence effect could be put to use by designing a system having an extraordinarily high electric field, wherein adjacent droplets are forced to combine to produce half as many drops of double size.

I claim:

1. An apparatus for forming beads from a fusible material comprising means for providing a free-falling stream of molten material,
means for applying a voltage to said stream,
means for varying the frequency of said voltage, and
means for varying the amplitude of said voltage.

2. An apparatus in accordance with claim 1 wherein said means for providing comprises delivery means for retaining a pool of molten material, said delivery means having an orifice from which said stream emanates.

3. An apparatus in accordance with claim 2 further comprising means for varying the flow through said delivery means.

4. An apparatus in accordance with claim 3 further comprising means for providing an indication of the voltage applied to said stream.

5. An apparatus in accordance with claim 4 further comprising an electrode disposed in said delivery means and at least partially immersed in said pool of molten material, said electrode being connected to said means for applying a voltage.

6. An apparatus in accordance with claim 4 wherein said delivery means is made from a conductive material, said delivery means being connected to said means for applying a voltage.

7. A method of facilitating the separation of a free falling stream of molten fusible material into sized spherical particles comprising applying a voltage to said stream,
varying the frequency of said voltage until the best quality drops appear to be formed from said stream, and
adjusting the amplitude of said voltage to a value at which the amplitude of vibration of said drops between elipsoidal extremes is minimized and any smaller secondary drops formed along with larger primary drops tend to coalesce with the primary drops.

8. A method in accordance with claim 7 further comprising the step of adjusting the flow rate of said stream to a rate near no-flow condition.

9. A method in accordance with claim 8 wherein the step of applying a voltage comprises the step of disposing a conductive electrode in a pool of molten material from which said stream is formed.

10. A method in accordance with claim 8 wherein the step of applying a voltage comprises the step of causing said stream to flow from a conductive delivery tube, and applying said voltage to said delivery tube.

11. A method in accordance with claim 8 wherein the step of adjusting the amplitude of said voltage comprises increasing said voltage until adjacent pairs of larger primary drops being formed from said stream tends to coalesce and form a single large drop.

12. A method of producing spherical glass beads of a controlled size comprising forming a free falling stream of molten glass,
applying a voltage to said stream, varying the frequency of said voltage until the best quality drops appear to be formed from said stream, adjusting the amplitude of said voltage to a value at which the amplitude of vibration of said drops between elipsoidal extremes is minimized and any smaller secondary drops formed along with larger primary drops tend to coalesce with the primary drops, and collecting the beads resulting from solidification of said drops.

References Cited

UNITED STATES PATENTS

| | | | |
|---|---|---|---|
| 2,889,580 | 6/1959 | Wald et al. | 65—21 |
| 3,123,855 | 3/1964 | Fischer et al. | 425—6 |
| 3,313,608 | 4/1967 | Guyer et al. | 65—142 X |
| 3,373,232 | 3/1968 | Wise et al. | 65—142 X |

ROBERT L. LINDSAY, JR., Primary Examiner

U.S. Cl. X.R.

65—142; 264—27; 425—6